3,564,068
DEMETHYLATION WITH BIMETALLIC COMPLEX CATALYSTS
Wolfram R. Kroll, Somerville, N.J., assignor to Esso Research and Engineering Company, a corporation of Delaware
No Drawing. Continuation-in-part of application Ser. No. 718,007, Apr. 1, 1968. This application Sept. 29, 1969, Ser. No. 862,082
Int. Cl. C07c 3/58; C10g 13/02
U.S. Cl. 260—672                                                14 Claims

ABSTRACT OF THE DISCLOSURE

Hydrocarbon compounds can be demethylated in the presence of hydrogen and a novel solid, reduced bimetallic catalyst prepared by reacting dimethyl or trimethyl aluminum derivatives with compounds of iron, cobalt, or nickel. The reaction may be utilized to remove one or more methyl or methylene groups from aliphatic, alkyl aromatic or alicyclic compounds, thereby reducing the carbon number of such compounds. In a preferred embodiment the reaction takes place at a reduced temperature.

FIELD OF INVENTION

This invention relates to the demethylation of hydrocarbon compounds. More particularly, the demethylation reaction is effected by contacting a hydrocarbon compound with hydrogen and a novel solid reduced bimetallic catalyst as disclosed in U.S. 3,409,681, the catalyst being prepared by reacting dimethyl or trimethyl aluminum compounds with compounds of iron, cobalt, or nickel. Thus, this invention may be employed to remove one or more methyl or methylene groups from aliphatic compounds, alkyl aromatic compounds or alicyclic compounds.

CROSS REFERENCE

This application is a continuation-in-part of application Ser. No. U.S. 718,007 filed Apr. 1, 1968 now abandoned.

PRIOR ART

Reactions in which methyl groups are removed from aliphatic compounds, or from alkyl aromatic compounds in the presence of hydrogen and a catalytic agent are well known to the art. Such reactions are generally conducted at relatively high temperatures, e.g., above about 400° C. for the demethylation of aliphatics, and above about 500° C. for the dealkylation of alkyl aromatics. While such processes have proved somewhat successful and are widely practiced on a commercial basis, there have been some serious drawbacks which affect the operation of processes. For example, hydrodealkylation processes generally result in the deposition of coke on the catalyst surface and frequent shutdown periods for catalyst regeneration are necessitated. Of course, the simple fact of coke deposition also means that the reaction is not selective to the desired product. Demethylation of aliphatic compounds suffer from the same drawbacks, i.e., coke deposition, catalyst regeneration, and relatively low selectivity to desired products. However, it has now been found that the carbon number of hydrocarbon compounds can be reduced, by removal of one or more methyl or methylene groups, at relatively low temperatures, thereby making the reaction more selective and minimizing undesirable side reactions. This has been achieved by employing a novel type of catalyst which has been disclosed in U.S. 3,409,681 and which possesses unusually high catalytic activity at low temperatures.

SUMMARY OF THE INVENTION

In accordance with this invention, therefore, aliphatic, alkyl aromatic, or alicyclic hydrocarbon compounds can be reduced in carbon number by the removal of one or more terminal methyl or terminal methylene groups from the compound, i.e., demethylation, by contacting the hydrocarbon compound with hydrogen and a novel solid reduced bimetallic catalyst prepared by reacting dimethyl or trimethyl aluminum compounds with compounds of iron, cobalt, or nickel. Thus, in various embodiments of this invention, aliphatic hydrocarbons can be demethylated to produce methane and a hydrocarbon of lower carbon number than the feed, and, if the demethylation is continued, large quantities of methane-containing gases, i.e., town gas (which is a generic term applied to fuel gases usually from coke oven gas and/or carbureted water gas and contains high methane concentrations) are produced. Also, alkyl-substituted aromatics may be demethylated, i.e., the aliphatic side chains are reduced in carbon number. In yet another embodiment, cyclic hydrocarbons can be treated in accordance with this invention to yield a product comprising an aliphatic compound of the same number of carbon atoms as the cyclic feed and/or aliphatic compounds of reduced carbon number. For example, cyclopropane can be treated to produce propane, ethane, and methane as products.

As employed for the purposes of this invention, the term "demethylation" refers to the removal of one or more terminal methyl or methylene groups from hydrocarbon compounds. Additionally, since the process described herein is equally applicable to the removal of methylene groups from alicyclic hydrocarbons and these compounds do not have a terminal group as such, the methylene group removed from such a compound will be considered a terminal group. Thus, methylene groups of the formulae $=CH_2$ which denotes a terminal aliphatic methylene, and $—CH_2—$ which denotes an alicyclic methylene can be removed by the process of this invention.

The catalyst employed in this invention is a solid reduced transition metal compound, wherein the transition metal is selected from the group consisting of iron, cobalt, and nickel. The preparation of this catalyst is fully described in U.S. 3,409,681, the portions relating to catalyst formation being incorporated herein by reference. Briefly, however, the catalyst is prepared by reacting an organoaluminum compound having the generic formula $Al(CH_3)_2Y$ wherein Y may be selected from the group consisting of halogen, hydrogen, pseudohalogen, e.g., CN group, lower alkoxides such as $C_1$-$C_4$ alkoxides, e.g., methoxide, ethoxide, butoxide, azide or methyl group, most preferably, the organoaluminum compound is trimethyl aluminum, with a transition metal compound to effect the reduction of the transition metal.

As mentioned, the transition metal may be iron, cobalt, or nickel or combinations thereof, nickel being most preferred. The transition metal can be contained in a variety of compounds and the anionic constituent of such compounds may be organic or inorganic. Inorganic constituents are exemplified by halides, e.g., chlorides, bromides, $SiF_6$ and the like, while organic constituents are exemplified by salts of fatty acids, e.g., acetates, naphthenates, alcohol derivatives, etc. Preferred organic anions are soluble, particularly the chelate, such as acetylacetonates or dimethyl glyoxime derivatives.

The catalyst preparation is generally conducted in a solvent, e.g., $C_5$–$C_{20}$ aliphatics or cycloaliphatics such as pentane, heptane, cyclohexane, cyclopentane, cyclododecane, $C_6$–$C_{12}$ aromatics such as benzene, or other solvents inert to the reaction such as ethers, e.g., diethyl ether, p-dioxane, diglyme, tertiary amines, e.g., triethylamine. Preferred solvents are the aliphatics, cycloaliphatics and aromatics. Reaction temperatures are generally in the range of $-50°$ to $300°$ C. and in most cases ambient temperature and pressure conditions are sufficient. The atomic ratio of aluminum to transition metal can range from 1/1 to 30/1, and is preferably 2/1 to 10/1. Generally, vigorous stirring is important to drive the reaction to completion, e.g., vibromixing, ultrasonic stirring or other well-known methods. During the reaction, the catalyst forms as a precipitate because of its low solubility, e.g., in about 1 to 30 minutes, and may be recovered by standard techniques, such as decantation, centrifugation, filtration, etc., and, because the precipitate is usually magnetic, magnetic recovery techniques can be used to advantage. The type of catalyst employed for this reaction is novel and possesses unusually high catalytic activity at low operating temperatures. By low temperature it is meant ambient to about $300°$ C. It is called a bimetallic catalyst and has been broadly described in U.S. 3,409,681 where it has been shown that it is unusually active for benzene hydrogenation at low temperature and low pressure. This catalyst consists of a complex, metal organic catalyst combination where one metal is always aluminum, the other a transition metal. It does not contain any free or occluded aluminumtrialkyl as this is completely removed by washing and treatment in vacuo. Such removal of the aluminumorganic reducing agent is necessary as it has been shown that such excess of aluminum trialkyl acts as a catalyst poison. The solid catalyst compositions disclosed by above patent are active without any support present thereby establishing themselves as a different class of catalysts than those prepared on solid supports. These bimetallic catalysts are also different from conventionally prepared reduced, finely divided metals because of their complex structure which stabilizes them and prevents sintering under reaction conditions. Because of the different nature of above catalysts compared with conventional supported catalysts it could not be predicted whether they would be active and advantageous in the demethylation reaction.

As previously mentioned, the process of this invention can be readily employed to reduce the carbon number by demethylation of a wide variety of hydrocarbon compounds. Thus, any aliphatic compounds, alkyl aromatic compounds, or alicyclic compounds, having terminal methyl or methylene groups, as hereinabove defined, may be treated by this process. It is noted that the process can be employed to remove one or more of these methyl or methylene groups. For example, heptane can be converted to hexane and if the reaction be continued to pentane, butane, propane, etc. with the successive removal of terminal methyl groups. When carried to completion with aliphatic compounds, large amounts of methane are produced, the product being a valuable fuel, i.e., town gas. Similarly, ethyl benzene can be converted to toluene which, in turn, can be converted to benzene. One skilled in the art will readily determine the proper conditions for the removal of one or more methyl or methylene groups. More specifically, this invention is applicable to aliphatic hydrocarbons having from 2 to about 60 carbon atoms, preferably 2 to about 16 carbon atoms, and such compounds may be saturated, unsaturated, straight chain, branched, or contain cyclic substituents. It should be noted that in the case of branched chain aliphatic compounds, demethylation will occur selectively at the head or tail of the molecule, that is, demethylation will occur to a greater extent in these positions, e.g., a $C_7$ methyl branched paraffin is converted to a $C_6$ methyl branched paraffin. Aromatic compounds having aliphatic substitution, such as $C_7$ to $C_{30}$ aliphatic-aromatic compounds, preferably $C_7$ to $C_{12}$ aliphatic-aromatics can be employed herein. In this instance, carrying the reaction to completion results in the formation of benzene and methane, both of which are valuable chemicals. The invention disclosed herein is also applicable to the demethylation of alicyclic compounds, either saturated or unsaturated, such as $C_3$ to $C_{12}$, preferably $C_3$ to $C_7$ alicyclic compounds. In such reactions when unsaturated alicyclic compounds are employed, the ring normally breaks at a saturated bond so that an olefin generally forms. In this embodiment, however, the reaction product may also contain a normal compound corresponding in carbon number to the cyclic compound, depending upon the extent of the reaction.

Some typical conversions that may be effected by this process are: n-octane to n-heptane to n-hexane, etc., 2,4-dimethyl pentane to 2-methyl pentane, 2,3-dimethyl pentane to 2-methyl pentane and/or 2,3-dimethyl butane, 2-methyl pentene-2 to 2-methyl butenes, hexene-1 to pentene-1 and/or pentane, 2-methyl pentene-1 to 2-methyl butenes, cyclopropane to propane and ethane, cyclohexane to n-hexane and pentane, cyclohexene to hexene and pentane and/or pentene, xylenes or ethyl benzene to toluene to benzene, styrene, to benzene, cumene to benzene, and the like.

It should be noted that, while the process disclosed herein is equally applicable to saturated and unsaturated, i.e., nonaromatic, compounds, the catalyst utilized is also known to be a hydrogenation catalyst. Consequently, when unsaturated compounds are to be demethylated, the operating conditions must be such that the hydrogenation-demethylation equilibrium must favor demethylation. With this factor in mind, however, reaction conditions can vary rather widely and it is a particular advantage of this process that demethylation can be effected at relatively low temperatures. Thus, temperatures may range from about $-50°$ to $+500°$ C., preferably from room temperature, i.e., 18 to $25°$ C., to about $400°$ C. In a preferred embodiment temperatures from ambient to about $300°$ C., i.e. $315°$ C. may be utilized. Within these ranges, however, the preferred temperatures for the demethylation of the various type of feed stocks which may be utilized herein can differ. For example, aliphatic compounds such as normal paraffins, e.g., heptanes, demethylate at about $150°$ to $250°$ C., e.g., $200°$ C., alicyclic compounds, e.g., cyclopropane, demethylate at temperatures of about 0 to $100°$ C., e.g., room temperature, while aromatics demethylate at about $250°$ to $350°$ C., e.g., $300°$ C.

Hydrogen pressures can also vary rather widely during the reaction and can range from about 1 mm. Hg. to 500 p.s.i., preferably atmospheric to about 100 p.s.i., still more preferably atmospheric to 30 p.s.i. It is noted that hydrogen has a dual role in this process, i.e., that of reactant and as a means for keeping the surface of the catalyst clean. Similar to the considerations of temperature, hydrogen pressures (concentrations) should be controlled to favor demethylation rather than hydrogenation. However, the proper choice of operating conditions will largely depend upon the type of feed stock that is being processed. Nevertheless, by following the general rule that lower hydrogen pressures and/or higher temperatures favor the demethylation reaction, one skilled in the art will experience no difficulty in determining optimum conditions for each reaction. For example, as the temperature of a given reaction, such as the dealkylation of an alkyl aromatic, decreases, lower hydrogen pressures (concentrations) should be employed to avoid saturation of the aromatic ring. The flow rate of the feed is generally adjusted to give the desired degree of conversion and can range from 0.5 WHSV to 50 WHSV, preferably about 1 to 20 WHSV. Catalyst concentrations are not critical and generally accepted catalytic quantities may be employed. However, catalyst concentrations normally range from about 0.1 to 60 wt. percent based on hydrocarbon feed, preferably 1 to 30 wt. percent.

The reaction can be either liquid or gaseous phase. When gas phase reactions are employed, hydrogen partial pressures should normally be in the lower region of the specified ranges. However, higher hydrogen partial pressures can be employed with liquid phase reactions. The reaction can be conducted with or without a diluent. But when diluents are employed they should be inert. Thus, diluents useful for gas phase reactions are typified by helium, nitrogen, argon, hydrogen, methane, carbon dioxide, and the like. Liquid phase diluents can be excess feeded benzene, ethers, etc.

If desired, the catalyst may be supported, e.g., on well-known catalyst support materials such as silica, alumina, silica-alumina, magnesia, zironia, titania, difficulty reducible metal oxides in general, charcoal, graphite, clays, diatomaceous earths, synthetic and natural molecular sieves such as mordenites and faujasites, and the like. The method for preparing the supported catalyst can vary, for example, the support can be present in the solution in which the precipitate is formed and becomes intimately contacted with the precipitate during the reaction to prepare the catalyst, or the catalyst precipitate may be recovered and ball milled with the support, in an inert atmosphere, e.g., argon, nitrogen, helium, hydrogen, etc., the precipitate and support thereby becoming intimately mixed.

The utility of the reactions described herein are manifest, for example, by successive demethylation, town gas, a valuable fuel gas, can be formed, octane values of gasoline additives may be increased by demethylating certain branched saturated hydrocarbons, waxes such as long chain paraffins can be converted to more volatile materials, cyclic saturated as well as unsaturated compounds can be converted into open chain compounds, valuable as chemical intermediates, dealkylation of alkyl aromatics to benzene, and many other uses. Also, if hydrogen is replaced in the described reactions, either partially or completely, by deuterium or tritium the reaction products are labeled. This labeling can occur under rather mild conditions and, depending on the reaction period, such labeling can be selective, quite extensive, or quantitative.

Having now described the invention, the following examples will further serve to illustrate the inventive process. However, no limitations, express or implied, are to be drawn from these examples since modifications and variations of the procedures set forth herein will be obvious to those skilled in the art.

EXAMPLES 1–3

A reduced nickel catalyst was prepared by reducing nickel acetylacetonate with trimethylaluminum as described in U.S. 3,409,681. In this particular case an atomic ratio of aluminum to nickel as 2.65:1 was used in the reduction. The solid catalyst (powder) was analyzed and found to contain 26.8% nickel and 16.9% aluminum. One gram (2.1 ml.) of this catalyst was mixed with 3.72 g. (3 ml.) of 10 x 20 broken beads and charged under nitrogen into a microreactor. After heat treatment with a hydrogen/helium mixture to 120° C. it was used for hydrodealkylation reactions at various temperatures. Table 1 shows the results obtained. They indicate that the reduced nickel catalyst is active in the hydrodealkylation under mild conditions. A reduced, heterogeneous cobalt catalyst prepared in a similar way does not show any activity under these conditions. As the selectivity is dropping slightly at 353° it is felt that operating at lower temperatures might be advantageous.

TABLE 1.—DEALKYLATION OF TOLUENE
[At atmospheric pressure]

| Example | 1 | 2 | 3 |
| --- | --- | --- | --- |
| Temperature (° C.) | 315 | 305 | 353 |
| WHSV (g./g./hr.) | 8.2 | 4.0 | 4.0 |
| Hydrogen:toluene molar ratio | 4.5 | 4.5 | 4.5 |
| Liquid product analysis (wt. percent): | | | |
| Benzene | 32.9 | 34.6 | 14.9 |
| Toluene | 63.6 | 61.0 | 82.8 |
| Total xylenes | 1.8 | 1.9 | 2.0 |
| Others | 1.7 | 2.5 | 0.3 |
| Selectivity to benzene, percent | 90 | 89 | 87 |

NOTE.—Liquid feed, 100% toluene; catalyst, same catalyst charge as in Example 1.

Table 2 shows a comparison of the reduced nickel catalyst (Example 1) with a commercial hydrodealkylation catalyst as described in U.S. 3,236,906.

TABLE 2.—COMPARISON OF REDUCED NICKEL CATALYST WITH A NICKEL-LOADED SODIUM Y ZEOLITE IN THE HYDRODEALKYLATION OF TOLUENE

| | Reduced Ni(acac)$_2$ | 2% Ni on sodium Y zeolite |
| --- | --- | --- |
| Average temperature, ° C. | 315 | 560 |
| Pressure, p.s.i.g. | <1 | 450 |
| H$_2$:HC | 4.5/1 | 10/1 |
| WHSV | 8.2 | 1 |
| Conversion | 36.4 | 40.8 |
| Hours on stream | 45 | 68 |
| Molar selectivity to: | | |
| Benzene | 90.4 | 52.8 |
| Xylenes | 4.95 | 23.4 |
| Nonaromatics | 4.67 | 23.8 |

NOTE.—acac = Acetylacetonate.

It is obvious that the reduced, heterogeneous nickel acetylacetonate catalyst is superior in selectivity to the commercial nickel-loaded zeolite

EXAMPLE 4

This example shows (see following table) the demethylation of n-heptane at various temperatures using the same reduced nickel catalyst which was described in Example 1.

TABLE 3.—DEMETHYLATION OF n-HEPTANE OVER A REDUCED NICKEL CATALYST

| Liquid products obtained at | 192° C. | 244° C. |
| --- | --- | --- |
| n-Heptane, percent wt. | 92.2 | 15.5 |
| n-Hexane, percent wt. | 7.4 | 33.4 |
| n-Pentane, percent wt. | 0.3 | 36.1 |
| n-Butane, percent wt. | 0.03 | 11.2 |
| Others, percent wt. | 0.1 | 3.8 |

NOTE.—Reaction conditions, reduced nickel acetylacetonate catalyst (1 gram); atmospheric total pressure; liquid space velocity 2.2 v/v/hr.; feed, n-heptane; hydrogen flow rate, 57 ml./min, hydrogen molar ratio 4:1.

At low temperatures a clean, specific demethylation to n-hexane occurs. At higher temperatures, the total conversion increases sharply and the effluent gas contains besides hydrogen large amounts of methane. This reaction is significant with the nickel catalyst, whereas an analogous reduced cobalt catalyst possesses lower activity, e.g., only a total of 4% demethylation at 237° C.

EXAMPLE 5

In this example, 2,4-dimethyl pentane was demethylated using 0.2384 g. of the reduced nickel catalyst preparation described in Example 1. The catalyst was mixed with 4 ml. of 10 x 20 mesh broken porcelain beads and charged into a microreactor under nitrogen. The catalyst was pretreated with a hydrogen/helium mixture up to 120° C. It was subsequently used for the demethylation run. The reaction conditions were as follows: 241° C., atmospheric total pressure, liquid feed rate: 9.4 v./v./hr., hydrogen to 2,4-dimethyl pentane ratio 4. At 6% conversion 91.6% 2-methyl pentane, 7.6% 2-methyl butane and 0.8% n-pentane were obtained. This means that a preferred cleavage occurs favoring the formation of the branched product by a factor of 9.5.

EXAMPLE 6

This example demonstrates the demethylation of 2,3-dimethylpentane over the same amount and the same type of reduced nickel catalyst as it was used in the previous example. Also, the reaction conditions are the same as in the previous example. A conversion of 36.6% was obtained. In the reaction products the ratio of 3-methyl pentane to 2-methyl pentane to 2,3-dimethyl butane was 2.2:1.3:3.2. This shows that the scope of the demethylation reaction is very broad, varying from substituted aromatics and cycloaliphatics to straight chain and branched chain paraffins.

EXAMPLE 7

This example shows the demethylation of cyclopropane using a reduced, complex nickel catalyst which was prepared by reduction of nickel-acetylacetylacetonate with trimethylaluminum in an atomic ratio of 1:2.65: Analysis of the catalyst showed 25.2% nickel and 15.6% aluminum. The reaction of cyclopropane with hydrogen leads to the formation of methane, ethane and propane. When passing at 61° C. a mixture of hydrogen (24 ml./min.) and cyclopropane (8 ml./min.) over 1 g. of the nickel catalyst (diluted with 5 ml. broken beads), a quantitative reaction of the cyclopropane occurred. G.C. analysis showed (on a hydrogen free basis): 21.8% methane; 23.5% ethane and 54.7% propane. Thus, demethylation and hydrogenation had occurred simultaneously. The total reaction presure was atmospheric.

EXAMPLE 8

The same reaction as described in Example 7 was carried out with 1 g. of a reduced complex cobalt catalyst that was prepared by reduction of cobalt II-acetylacetonate with trimethylaluminum using an atomic ratio of cobalt to aluminum as 1:3. The resulting solid powdery cobalt catalyst showed the following G.C. analysis: 37.6% cobalt and 11.2% aluminum. Using the same gas mixture, flow rates and temperature, as in Example 7, the following gaseous products were obtained according to G.C. analysis (on a hydrogen free basis): 1.9% methane; 1.9% ethane; 10.9% propane; 85.3% cyclopropane. Thus, the overall conversion was lower with the cobalt catalyst.

EXAMPLE 9

The same cyclopropane reaction as described in Examples 7 and 8 was carried out with 1 g. of a reduced, complex iron catalyst which was prepared by reduction of ferricacetacetonate with trimethylaluminum in an atomic ratio of iron to aluminum as 1:4.48. The resulting reduced, powdery iron catalyst was analyzed and contained 53.9% iron and 4.80% aluminum. Using the same gas mixture, flow rates, temperatures and pressures, as in the previous example, the following conversion was obtained (gas phase, continuous process): 0.3% methane; 0.3% ethane; 5.5% propane; 93.9% cyclopropane.

EXAMPLES 10 AND 11

The reaction of a cyclopropane/hydrogen mixture with a reduced nickel and a reduced cobalt catalyst at atmospheric pressure occurs readily at ambient temperature. The reduced nickel catalyst was the same as in Example 7. It was prepared by reaction of trimethylaluminum with nickel acetylacetonate in an atomic ratio of 2.65:1. One half gram of this solid, powdery catalyst was mixed with 5 ml. of broken porcelain beads. Subsequently a mixture of helium at 60 ml./min., cyclopropane at 5 ml./min. and hydrogen at ~8 ml./min. were passed over the nickel catalyst at ambient temperature. The analysis of the reaction products is shown in the next table. The reduced cobalt catalyst is of the same batch as the one used in Example 8. One gram of this catalyst (equal to 2.0 ml.) was diluted with 5 ml. porcelain beads. Subsequently a gas mixture consisting of 40 ml./min. hydrogen and 8.5 ml./min. cyclopropane was passed over the catalyst at 28° C. The analysis of the gaseous products is shown in the following table.

TABLE 4.—ANALYSIS OF GASEOUS PRODUCTS BY G.C.
[Volume percent]

|  | Colbalt catalyst (reaction at 28° C.) | Nickel catalyst (reaction at 26° C.) |
|---|---|---|

NOTE.—Calculated free of hydrogen.

In both cases demethylation and hydrogenation are observed under mild conditions.

What is claimed is:

1. A demethylation process which comprises contacting hydrocarbons with hydrogen and a solid reduced transition metal catalyst prepared by reacting a transition metal compound wherein the metal is selected from the group consisting of iron, cobalt, and nickel with an organoaluminum compound having the formula $$Al(CH_3)_2Y$$

wherein Y is selected from the group consisting of hydrogen, halogen, pseudohalogen, lower alkoxides, azide, and methyl radicals.

2. The process of claim 1 wherein the process is conducted at temperatures ranging from about −50° C. to +500° C. and hydrogen pressures ranging from about 1 mm. to 500 p.s.i.

3. The process of claim 1 wherein the metal is nickel.

4. The process of claim 1 wherein the organoaluminum compound is trimethylaluminum.

5. The process of claim 1 wherein the hydrocarbon is selected from the group consisting of aliphatic, alicyclic, aliphatic-aromatic compounds or mixtures thereof.

6. The process of claim 1 wherein the process is conducted at a temperature of ambient to about 300° C.

7. A demethylation process which comprises contacting hydrocarbons selected from the group consisting of aliphatic, and aliphatic-aromatic compounds with hydrogen and a solid reduced transition metal catalyst prepared by reacting a transition metal compound wherein the metal is selected from the group consisting of iron, cobalt, and nickel with an organoaluminum compound having the formula $Al(CH_3)_2Y$ wherein Y is selected from the group consisting of hydrogen, halogen, pseudohalogen, lower alkoxides, azide, and methyl radicals, at temperatures ranging from about −50° C. to about 500° C. and hydrogen pressures ranging from about 1 mm. to 500 p.s.i.

8. The process of claim 7 wherein the temperature ranges from about room temperature to about 300° C. and the hydrogen pressure ranges from about atmospheric to about 100 p.s.i.

9. The process of claim 7 wherein the transition metal compound is a hydrocarbon soluble nickel compound and the organoaluminum compound is trimethylaluminum.

10. The process of claim 9 wherein the hydrocarbon is a $C_2$–$C_{60}$ aliphatic or mixtures thereof.

11. The process of claim 10 wherein the reaction is continued to effect the preparation of substantial amounts of methane.

12. The process of claim 10 wherein the aliphatic is saturated.

13. The process of claim 9 wherein the hydrocarbon is a $C_3$–$C_{12}$ alicyclic or mixtures thereof.

14. The process of claim 9 wherein the hydrocarbon is a $C_7$–$C_{30}$ aliphatic-aromatic or mixtures thereof.

(References on following page)

References Cited

UNITED STATES PATENTS

| | | | |
|---|---|---|---|
| 2,422,670 | 6/1947 | Haensel et al. | 260—683.6 |
| 2,422,671 | 6/1947 | Haensel et al. | 260—683.6 |
| 2,422,672 | 6/1947 | Haensel et al. | 260—683.6 |
| 2,422,673 | 6/1947 | Haensel et al. | 260—672 |
| 2,422,674 | 6/1947 | Haensel et al. | 260—683.6 |
| 2,422,675 | 6/1947 | Haensel et al. | 260—683.6 |
| 2,880,251 | 3/1959 | Jezl et al. | 260—672 |
| 3,205,278 | 5/1965 | Lapporte | 260—677 |
| 3,236,904 | 2/1966 | Pickert | 75—108X |
| 3,240,697 | 3/1966 | Miale et al. | 208—120 |
| 3,314,895 | 4/1967 | Munns | 260—672 |

DELBERT E. GANTZ, Primary Examiner

G. E. SCHMITKONS, Assistant Examiner

U.S. Cl. X.R.

260—666, 676